United States Patent
Hirano et al.

(10) Patent No.: US 9,443,557 B2
(45) Date of Patent: Sep. 13, 2016

(54) RECORDING APPARATUS, RECORDING METHOD, AND REPRODUCING APPARATUS

(71) Applicant: Sony Corporation, Tokyo (JP)

(72) Inventors: Takashi Hirano, Saitama (JP); Ryoichi Sakuragi, Tokyo (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 14/229,143

(22) Filed: Mar. 28, 2014

(65) Prior Publication Data

US 2014/0301714 A1 Oct. 9, 2014

(30) Foreign Application Priority Data

Apr. 5, 2013 (JP) .................................. 2013-079628

(51) Int. Cl.
| | |
|---|---|
| *G11B 27/34* | (2006.01) |
| *G11B 27/00* | (2006.01) |
| *G11B 27/11* | (2006.01) |
| *H04N 9/82* | (2006.01) |
| *H04N 5/85* | (2006.01) |

(52) U.S. Cl.
CPC .............. *G11B 27/34* (2013.01); *G11B 27/002* (2013.01); *G11B 27/11* (2013.01); *H04N 9/8227* (2013.01); *G11B 2220/41* (2013.01); *H04N 5/85* (2013.01)

(58) Field of Classification Search
CPC ................................ G11B 27/34; G11B 27/11
See application file for complete search history.

(56) References Cited

U.S. PATENT DOCUMENTS

| | | | |
|---|---|---|---|
| 2005/0069296 A1* | 3/2005 | Yoshida ............... | G11B 27/034 386/289 |
| 2007/0174545 A1* | 7/2007 | Okada .................... | G06F 3/0605 711/112 |
| 2007/0217763 A1* | 9/2007 | Siemens .......... | G08B 13/19667 386/226 |
| 2007/0220021 A1* | 9/2007 | Kato .................. | G06F 17/30017 |
| 2008/0256242 A1* | 10/2008 | Liebman .............. | G11B 27/034 709/226 |
| 2013/0325525 A1* | 12/2013 | Boyd, Jr. ........... | G06Q 30/0631 705/5 |

* cited by examiner

*Primary Examiner* — Eileen Adams
(74) *Attorney, Agent, or Firm* — Sheridan Ross P.C.

(57) ABSTRACT

A recording apparatus includes a data recording unit configured to record data in a cartridge which is mounted on a cartridge mounting unit and stores a plurality of recording media, the data recording unit being configured to record a first resolution video data file having a first resolution in a first recording medium of the cartridge and record, in a second recording medium of the cartridge, a second resolution video data file having another resolution lower than the first resolution corresponding to the first resolution video data file recorded in the first recording medium.

9 Claims, 6 Drawing Sheets

RECORDING APPARATUS, RECORDING METHOD, AND REPRODUCING APPARATUS

CROSS REFERENCE TO RELATED APPLICATIONS

This application claims the benefit of Japanese Priority Patent Application JP 2013-079628 filed Apr. 5, 2013, the entire contents of which are incorporated herein by reference.

BACKGROUND

The present disclosure relates to a recording apparatus, a recording method, and a reproducing apparatus, and more particularly, to a recording apparatus and the like for handling a cartridge which stores a plurality of recording media.

An original video data file and a proxy (low resolution) video data file generated based on the original are often recorded together in media such as a compact disc (CD), a Blu-ray disc (BD), and a flash memory. It should be noted that "Blu-ray" is a registered trademark. It is generally known that those paired video data files are recorded and stored in one recording medium. The proxy video data file has an advantage in that the video data file can be handled effectively compared to the original video data file with a large file size by use in previewing or editing.

For example, Japanese Patent Application Laid-Open No. 2004-064155 describes that a low resolution video data file is saved in a high-speed primary recording medium (for example, hard disc drive (HDD)), a high resolution video data file is saved in a low-speed secondary recording medium (for example, video tape or digital versatile disc (DVD)), and these video data files are managed by a server.

SUMMARY

When the original video data file and the proxy video data file are recorded in one recording medium, the following problem occurs. That is, it is necessary to read all recording media in a cartridge for obtaining all proxy video data files from the cartridge which stores a plurality of recording media. This is inefficient.

It is desirable to ensure effective obtaining of the proxy video data file from the cartridge which stores the plurality of recording media.

According to an embodiment of the present disclosure, there is provided a recording apparatus including a data recording unit configured to record data in a cartridge which is mounted on a cartridge mounting unit and stores a plurality of recording media, the data recording unit being configured to record a first resolution video data file having a first resolution in a first recording medium of the cartridge and record, in a second recording medium of the cartridge, a second resolution video data file having another resolution lower than the first resolution corresponding to the first resolution video data file recorded in the first recording medium.

In the embodiment of the present disclosure, the data recording unit records the data in the cartridge which is mounted on the cartridge mounting unit and stores the plurality of recording media. Herein, the recording medium is disc- or tape-shaped, for example. The data recording unit records the first resolution video data file in the first recording medium of the cartridge. Moreover, the data recording unit records, in the second recording medium of the cartridge, the second resolution video data file (proxy video data file) having a resolution lower than the first resolution corresponding to the first resolution video data file recorded in the first recording medium.

Thus, in the embodiment of the present disclosure, the second recording medium of the cartridge records the second resolution video data file (proxy video data file) corresponding to the first resolution video data file. Accordingly, the proxy video data files corresponding to all of the first resolution video data files in the cartridge can be obtained without accessing all recording media of the cartridge. Therefore, the proxy video data files can be effectively obtained.

In the embodiment of the present disclosure, for example, the recording apparatus may further include a file system driver having a function of representing the plurality of recording media as one volume. In this case, for example, the data recording unit may be configured to record a predetermined number of the first resolution video data files in the first recording medium constituting the one volume and then record the predetermined number of the second resolution video data files in the second recording medium constituting the one volume.

Moreover, in the embodiment of the present disclosure, for example, the recording apparatus further include a file system driver having a function of representing the first recording medium as a first volume and the second recording medium as a second volume. In this case, for example, the data recording unit may be configured to record one second resolution video data file in the second volume every time one first resolution video data file is recorded in the first volume.

Moreover, in the embodiment of the present disclosure, for example, the data recording unit may be configured to record, in the second recording medium, a record management file for associating the first resolution video data file recorded in the first recording medium with the second resolution video data file recorded in the second recording medium. The record management file may be created, for example, in a comma separated value (CSV) or an extensible markup language (XML) format. Thus, since the record management file is recorded in the second recording medium, it is possible to easily grasp a correspondence relationship between the first resolution video data file recorded in the first recording medium and the second resolution video data file recorded in the second recording medium based on the record management file.

Moreover, in the embodiment of the present disclosure, for example, the data recording unit may be configured to record, in the second recording medium, a thumbnail data file corresponding to the first resolution video data file recorded in the first recording medium. In this case, the thumbnail image corresponding to each of the first resolution video data files recorded in the cartridge can be displayed by only accessing the second recording medium of the cartridge, and the contents of each of the first resolution video data files recorded in the cartridge can be checked effectively.

Moreover, in the embodiment of the present disclosure, for example, the data recording unit may be configured to record, in the second recording medium, a metadata file corresponding to the first resolution video data file recorded in the first recording medium. In this case, information corresponding to each of the first resolution video data files recorded in the cartridge can be displayed by only accessing the second recording medium of the cartridge, and the contents of each of the first resolution video data files recorded in the cartridge can be checked effectively.

Moreover, according to another embodiment of the present disclosure, there is provided a reproducing apparatus including a data reproducing unit configured to reproduce data from a cartridge which is mounted on a cartridge mounting unit and stores a plurality of recording media, the cartridge including a first recording medium and a second recording medium, the first recording medium recording a first resolution video data file having a first resolution, the second recording medium recording a second resolution video data file having another resolution lower than the first resolution corresponding to the first resolution video data file recorded in the first recording medium and a record management file for associating the first resolution video data file recorded in the first recording medium with the second resolution video data file recorded in the second recording medium, the data reproducing unit being configured to extract the record management file from the second recording medium and recognize a correspondence between the first resolution video data file recorded in the first recording medium and the second resolution video data file recorded in the second recording medium.

In the embodiment of the present disclosure, the data reproducing unit reproduces the data from the cartridge which is mounted on the cartridge mounting unit and stores the plurality of recording media. Herein, the recording medium is disc- or tape-shaped, for example. The first recording medium of the cartridge records the first resolution video data file. Moreover, the second recording medium of the cartridge records the second resolution video data file having a resolution lower than the first resolution corresponding to the first resolution video data file recorded in the first recording medium, and the record management file for associating the first resolution video data file recorded in the first recording medium with the second resolution video data file recorded in the second recording medium.

The data reproducing unit extracts the record management file from the second recording medium and recognizes a correspondence between the first resolution video data file recorded in the first recording medium and the second resolution video data file (proxy video data file) recorded in the second recording medium.

Thus, in the embodiment of the present disclosure, since the data reproducing unit extracts the record management file recorded in the second recording medium, the data reproducing unit recognizes the correspondence between the first resolution video data file recorded in the first recording medium and the second resolution video data file (proxy video data file) recorded in the second recording medium. Therefore, for example, it is possible to easily reproduce, from the first recording medium, the first resolution video data file corresponding to a predetermined proxy video data file selected by a user.

It should be noted that in the embodiment of the present disclosure, for example, the reproducing apparatus, in which the second recording medium of the cartridge further stores a thumbnail data file corresponding to the first resolution video data file recorded in the first recording medium, may further include a reproduction controller configured to execute control to display a thumbnail image according to the thumbnail data file reproduced by the data reproducing unit, and reproduce the second resolution video data file by the data reproducing unit based on an operation input corresponding to the thumbnail image and display a low resolution image according to the reproduced second resolution video data file. In this case, the user can easily select the second video data file (proxy video data file) to be reproduced and displayed based on the displayed thumbnail image.

Moreover, in the embodiment of the present disclosure, the reproducing apparatus, in which the second recording medium of the cartridge further stores a thumbnail data file corresponding to the first resolution video data file recorded in the first recording medium, may further include a reproduction controller configured to execute control to display a thumbnail image according to the thumbnail data file reproduced by the data reproducing unit, and display a save button adjacent to the thumbnail image, reproduce the first resolution video data file by the data reproducing unit based on an operation input corresponding to the save button, and save the reproduced first resolution video data file. In this case, the user can easily select the first video data file to be reproduced and saved based on the displayed thumbnail image.

According to the embodiments of the present disclosure, it is possible to effectively obtain the proxy video data files from the cartridge which stores the plurality of recording media.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
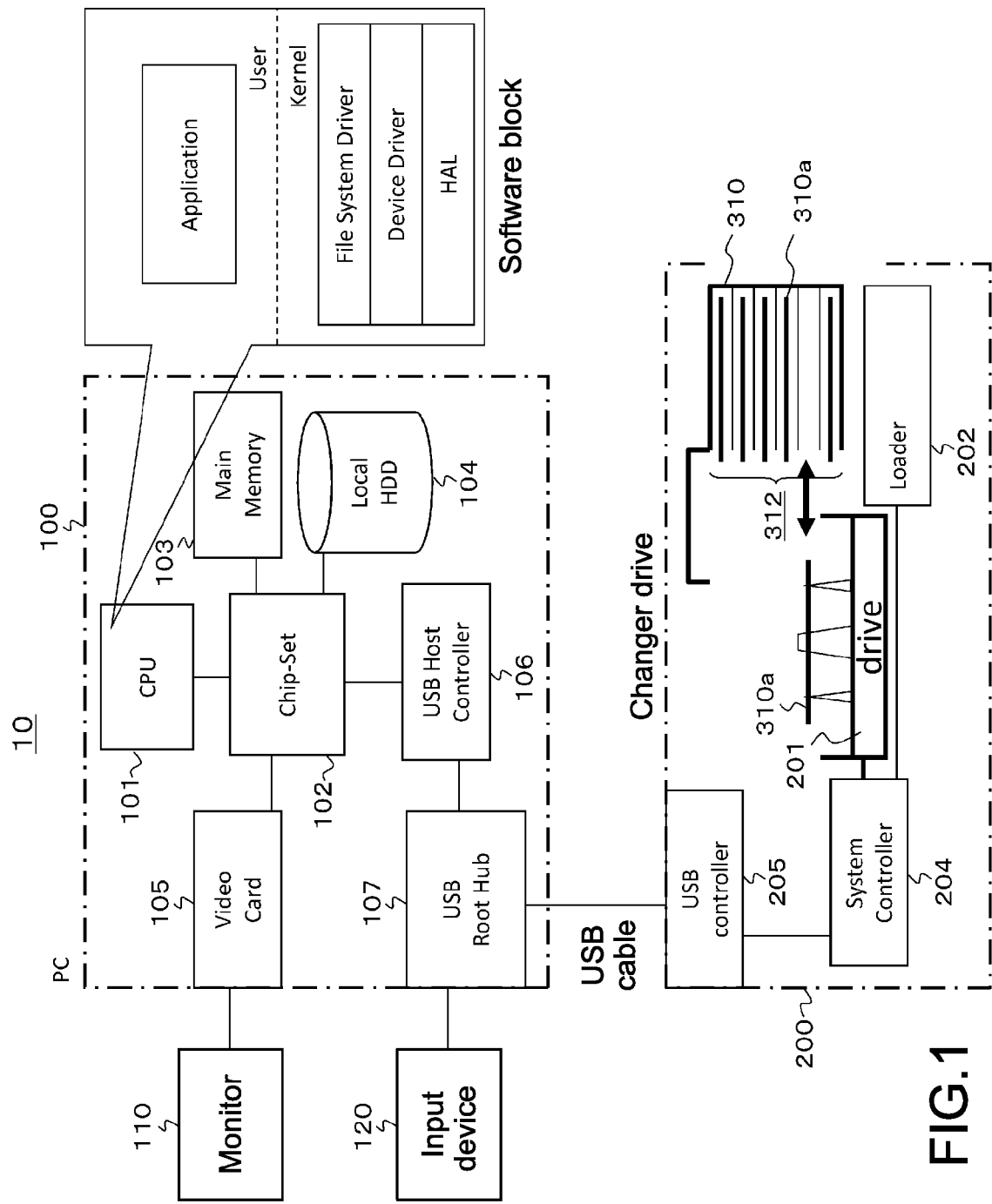
FIG. 1 is a diagram showing a configuration example of a recording and reproducing apparatus according to an embodiment.

Hereinafter, an embodiment for carrying out the present disclosure (below, referred to as an embodiment) will be described. In this regard, the description will be made in the following order.
1. Embodiment
2. Modified Example 1. Embodiment Configuration Example of Recording and Reproducing Apparatus FIG. 1 shows a configuration example of a recording and reproducing apparatus 10 according to an embodiment. The recording and reproducing apparatus 10 is configured to connect a changer drive 200 to a personal computer (PC) 100 through a universal serial bus (USB) cable. The PC 100 uses the changer drive 200 as a storage device.

The PC 100 includes a central processing unit (CPU) 101, a chip-set 102, a main memory 103, a local hard disk drive (HDD) 104, a video card 105, a USB host controller 106, and a USB root hub 107. An input device 120 such as a monitor 110, a mouse, a keyboard, or a touch panel is connected to the PC 100 as a user interface.

The CPU 101 includes a file system driver, a device driver, a hardware abstraction layer (HAL), and the like as software executed on the CPU 101 in addition to various applications. The HAL is provided as an interface (I/F) in which a physical input/output (I/O) of the device is standardized. The device driver provides the I/F standardized to the changer drive 200 connected through the USB. The file system driver provides the I/F of a standardized file system such as a directory structure and a file.

The changer drive 200 includes an optical disc drive 201, a loader 202, a system controller 204, and a USB controller 205. The changer drive 200 uses a predetermined number of recording media (herein, a cartridge 310 which stores an optical disc 310*a*) therein as removal recording media.

The changer drive 200 is controlled by a USB command from the PC 100 as a USB mass storage class. The loader 202 loads the optical disc 310*a* of any slot 312 within the cartridge 310 on the optical disc drive 201 by the command from the PC 100 or unloads (ejects) the optical disc 310*a* and stores the optical disc 310*a* in the original slot 312 of the cartridge 310. The optical disc drive 201 records and reproduces the loaded optical disc 310*a*.

The operation at the time of data recording will be described. In this case, a plurality of data file sets are prepared in advance in the local HDD 104. One data file set is constituted of a high resolution video data file, a low resolution video data file (proxy video data file), a thumbnail data file, and a metadata file.

Herein, for example, the high resolution video data file is a material exchange format (MXF) file having 1920*1080 pixel video data. Moreover, for example, the low resolution video data file is a file which is scaled down to 480*270 pixel video data from the 1920*1080 pixel video data and includes a video data compressed by Moving Picture Experts Group (MPEG) 4, Advanced Video Coding (AVC), Windows Media Video (WMV), and the like. The low resolution video data file is used in an edition or preview to suppress a reproduction speed, a network load, a CPU load, and the like.

Moreover, the thumbnail data file is a file which includes still image data of one or plurality of typical images extracted from a moving image and compressed by Joint Photographic Experts Group (JPEG), Portable Network Graphics (PNG), and the like. The thumbnail data file is used to check a list of the moving image. Moreover, the metadata file is a file including information of a photographed date, a photographed place, a photographer, and the like. The metadata file is used as auxiliary information of the moving image and is helpful in reusing the video.

Figure 2:
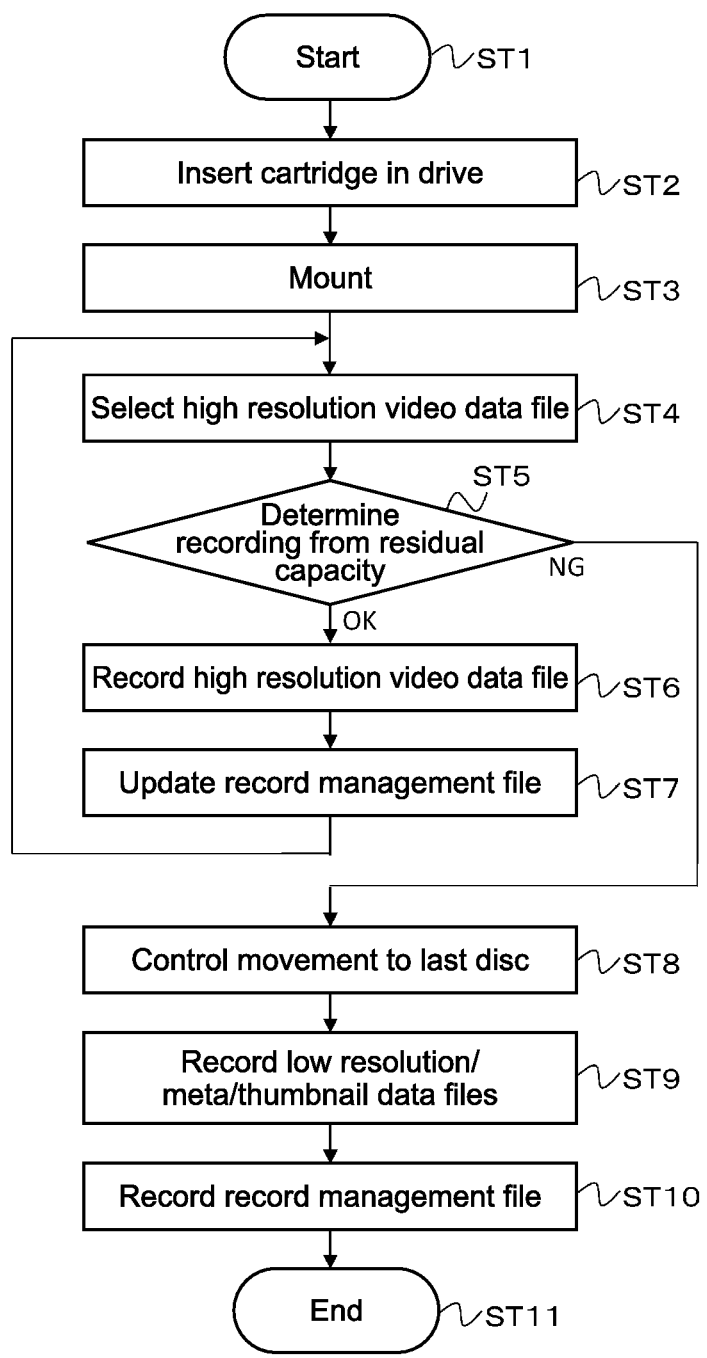
FIG. 2 is a flowchart showing an example of a processing procedure at the time of data recording.

A flowchart in FIG. 2 shows an example of a processing procedure at the time of data recording. This is a case where the file system driver includes a function of representing a plurality of optical discs 310*a* of the cartridge 310 as one volume.

In step ST1, the CPU 101 starts the processing. Subsequently, in step ST2, the cartridge 310 is inserted in the changer drive 200. Next, in step ST3, the file system driver is automatically mounted as a file system. It should be noted that this mount may be performed by making a request from the CPU 101 to the file system driver.

Next, in step ST4, for example, the CPU 101 selects a predetermined high resolution video data file (therefore, a data file set including this high resolution video data file) from the local HDD 104 based on a user's operation. It should be noted that although not shown here, it is possible to select the data file set from the HDD and the like externally attached to the PC 100.

Next, in step ST5, the CPU 101 determines whether or not a recording is allowed from a residual capacity of the cartridge 310. In this case, the CPU 101 determines that the recording is not allowed when at least one of the following conditions (1) and (2) is satisfied, and the recording is allowed in other cases.

(1) The total capacity of the high resolution video data file to be recorded and the corresponding low resolution video data file, metadata file, and thumbnail data file, the total capacity of the recorded high resolution video data file and the corresponding low resolution video data file, metadata file, and thumbnail data file, and the total capacity of the record management file exceed the residual capacity.

(2) The total capacity of the low resolution video data file, the metadata file, and the thumbnail data file corresponding to the high resolution video data file to be recorded, and the total capacity of the low resolution video data file, the metadata file, and the thumbnail data file corresponding to the recorded high resolution video data file, and the total capacity of the record management file exceed the residual capacity of one optical disc 310*a*.

It should be noted that the determination of the residual capacity may be given with some margin. Moreover, two or more two optical discs 310*a* in which the low resolution video data file, the metadata file, the thumbnail data file, and the record management file are written can be allocated depending on size ratios of the high resolution video data file and the low resolution video data file. In this case, "the residual capacity of the one optical disc 310*a*" in the above-mentioned condition (2) is "the residual capacity of the allocated number of optical discs 310*a*".

When the CPU 101 determines that the recording is allowed, the CPU 101 transfers the high resolution video data file to the changer drive 200 and writes it in a first optical disc 310*a* of the cartridge 310 in step ST6. Herein, the first optical disc 310*a* is the optical disc 310*a* allocated for writing the high resolution video data file among the plurality of optical discs 310*a* stored in the cartridge 310. In this case, for example, the lowermost optical disc 310*a* is written and when the residual capacity of the optical disc 310*a* that has been written on becomes insufficient, the next optical disc 310*a* is automatically written.

Next, in step ST7, the CPU 101 updates the record management file so as to include association information of the recorded high resolution video data file and the corresponding low resolution video data file, metadata file, and thumbnail data file. For example, this record management file is updated on the main memory 103. After step ST7, the CPU 101 returns to step ST4 and repeats the same processing as mentioned above.

Herein, for example, the record management file is created so that the file is correlated in a CSV or an XML format. An example of creating the format will be described below.

Example of CSV Format
Original high resolution video data, proxy data, thumbnail data, and metadata data
movie1.mxf, movie1.mp4, movie1.jpg, movie1.meta
movie2.mxf, movie2.mp4, movie2.jpg, movie2.meta
movie3.mxf, movie3.mp4, movie3.jpg, movie3.meta
movie4.mxf, movie4.mp4, movie4.jpg, movie4.meta
Example of XML Format <movie original high resolution video data ="movie1.mxf" proxy data ="movie1.mp4" thumbnail data ="movie1.jpg" metadata data ="movie1.meta" />
<movie original high resolution video data ="movie2.mxf" proxy data ="movie2.mp4" thumbnail data ="movie2.jpg" metadata data ="movie2.meta" />

```
<movie original high resolution video data ="movie3.mxf"
proxy data ="movie3.mp4" thumbnail data ="movie3.jpg"
metadata data ="movie3.meta" />
```

When the CPU 101 determines that the recording is not allowed in step ST5, the CPU 101 controls the changer drive 200 so that only when the last optical disc 310a is not loaded in step ST8, the optical disc 310a is loaded. It should be noted that this is a case where only the last one optical disc 310a is allocated to a second optical disc 310a. Herein, the second optical disc 310a is the optical disc 310a allocated for writing the low resolution video data file, the metadata file, the thumbnail data file, and the record management file.

Next, in step ST9, the CPU 101 transfers the low resolution video data file, the metadata file, and the thumbnail data file to the changer drive 200 and writes them in the second optical disc 310a of the cartridge 310. Next, in step ST10, the CPU 101 transfers the record management file to the changer drive 200 and writes it in the second optical disc 310a of the cartridge 310. Subsequently, in step ST11, the CPU 101 completes the processing.

Figure 3:
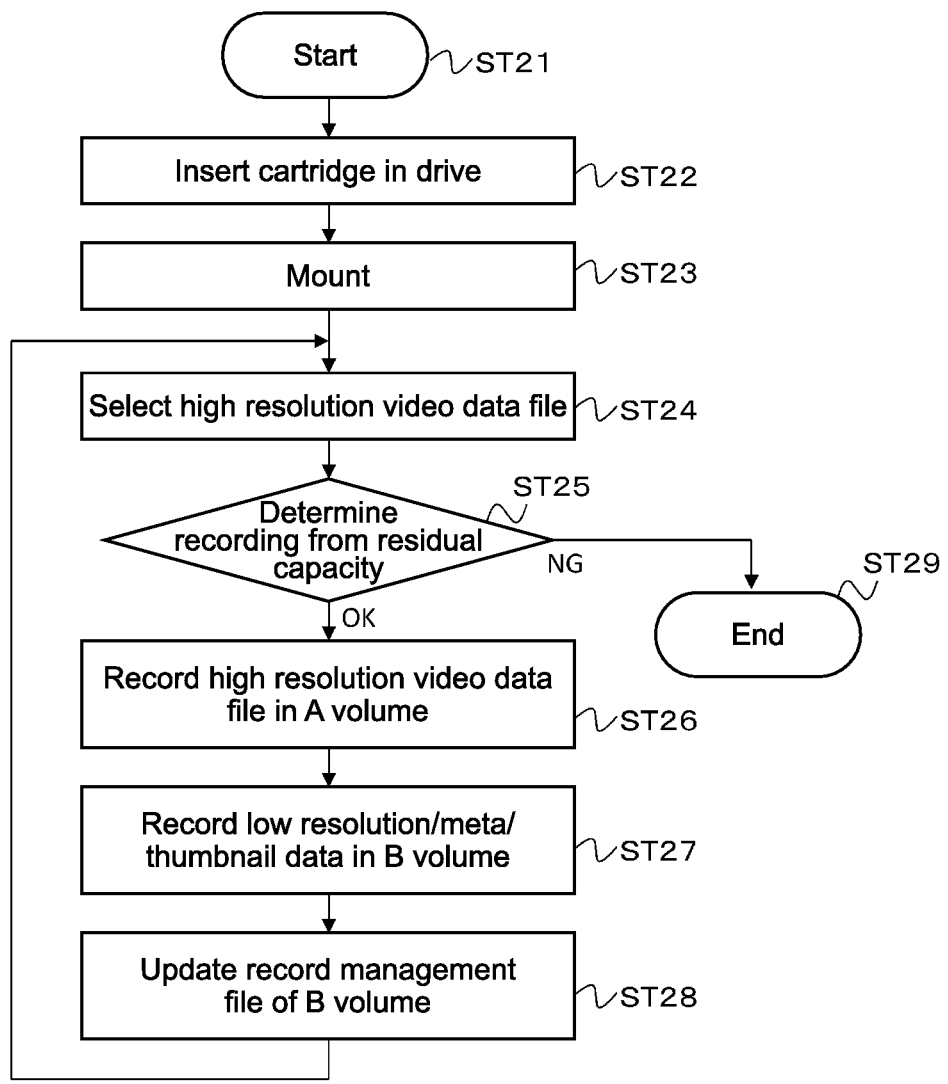
FIG. 3 is a flowchart showing an example of another processing procedure at the time of data recording.

A flowchart in FIG. 3 also shows an example of a processing procedure at the time of data recording. This is a case where the file system driver includes a function of representing the first optical discs 310a of the cartridge 310 as an A volume (first volume) and the second optical discs 310a of the cartridge 310 as a B volume (second volume).

In step ST21, the CPU 101 starts the processing. Subsequently, in step ST22, the cartridge 310 is inserted in the changer drive 200. Next, in step ST23, the file system driver is automatically mounted as the file system. It should be noted that this mount may be performed by making a request from the CPU 101 to the file system driver.

Next, in step ST24, for example, the CPU 101 selects a predetermined high resolution video data file (therefore, a data file set including this high resolution video data file) from the local HDD 104 based on the user's operation. It should be noted that although not shown here, it is possible to select the data file set from the HDD and the like externally attached to the PC 100.

Next, in step ST25, the CPU 101 determines whether or not a recording is allowed from the residual capacity of the cartridge 310. In this case, the CPU 101 determines that the recording is not allowed when at least one of the following conditions (1) and (2) is satisfied, and the recording is allowed in other cases.

(1) The total capacity of the high resolution video data file to be recorded exceeds the residual capacity of the A volume (first volume).

(2) The total capacity of the low resolution video data, the metadata, and the thumbnail data corresponding to the high resolution video data file to be recorded and the total capacity of the record management file exceed the residual capacity of the B volume (second volume).

When the CPU 101 determines that the recording is allowed, the CPU 101 transfers the high resolution video data file to the changer drive 200 and writes it in the first optical disc 310a constituting the A volume of the cartridge 310 in step ST26. Next, in step ST27, the CPU 101 transfers the low resolution video data file, the metadata file, and the thumbnail data file to the changer drive 200 and writes them in the second optical disc 310a constituting the B volume of the cartridge 310.

Next, in step ST28, the CPU 101 updates the record management file in the second optical disc 310a constituting the B volume of the cartridge 310 so as to include association information of the recorded high resolution video data file and the corresponding low resolution video data file, metadata file, and thumbnail data file. After step ST28, the CPU 101 returns to step ST24 and repeats the same processing as mentioned above.

When the CPU 101 determines that the recording is not allowed in step ST25, the CPU 101 completes the processing in step ST29.

It should be noted that the above description shows the example where the record management file is written together with the low resolution video data file, the metadata file, and the thumbnail data file. However, the low resolution video data file, the metadata file, and the thumbnail data file corresponding to the high resolution video data file may be judged by difference in extensions (for example, "movie1.mxf, movie1.mp4, movie1.meta, movie1.jpg") without writing the record management file.

Figure 4:
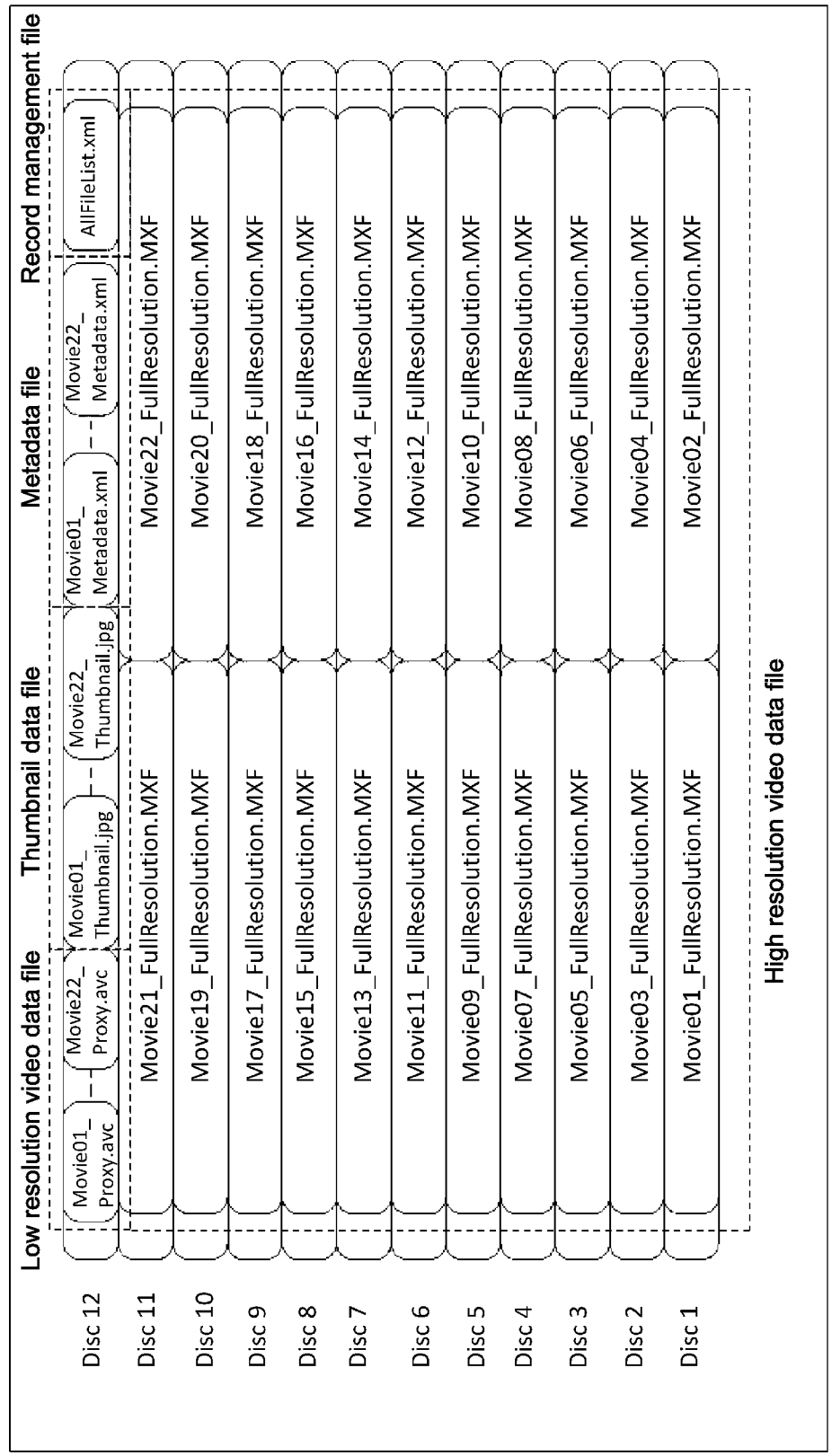
FIG. 4 is a diagram showing an example of data recording to a cartridge.

FIG. 4 shows an example of data recording to the cartridge 310. In this example, 12 optical discs 310a are stored in the cartridge 310. 22 high resolution video data files of "Movie01 FullResolution.MXF" to "Movie22 FullResolution.MXF" are recorded in 11 optical discs 310a of "Disc 1" to "Disc 11".

Moreover, 22 low resolution video data files of "Movie01_Proxy.avc" to "Movie22_Proxy.avc", 22 thumbnail data files of "Movie01_Thumbnail.jpg" to "Movie22_Thumbnail.jpg", 22 metadata files of "Movie01_Metadata.xml" to "Movie22_Metadata.xml", and the record management file of "AllFileList.xml" corresponding to the recorded high resolution video data files are recorded in the last optical disc 310a of "Disc 12".

Next, the operation at the time of data reproducing will be described. In this case, a plurality of date file sets are recorded in the cartridge 310 inserted in the changer drive 200. One data file set is constituted of the high resolution video data file, the low resolution video data file (proxy video data file), the thumbnail data file, and the metadata file.

Then, in this case, the high resolution video data file is recorded in the first optical disc 310a of the cartridge 310. Moreover, the low resolution video data file (proxy video data file), the thumbnail data file, the metadata file, and the record management file are recorded in the second optical disc 310a of the cartridge 310.

Figure 5:
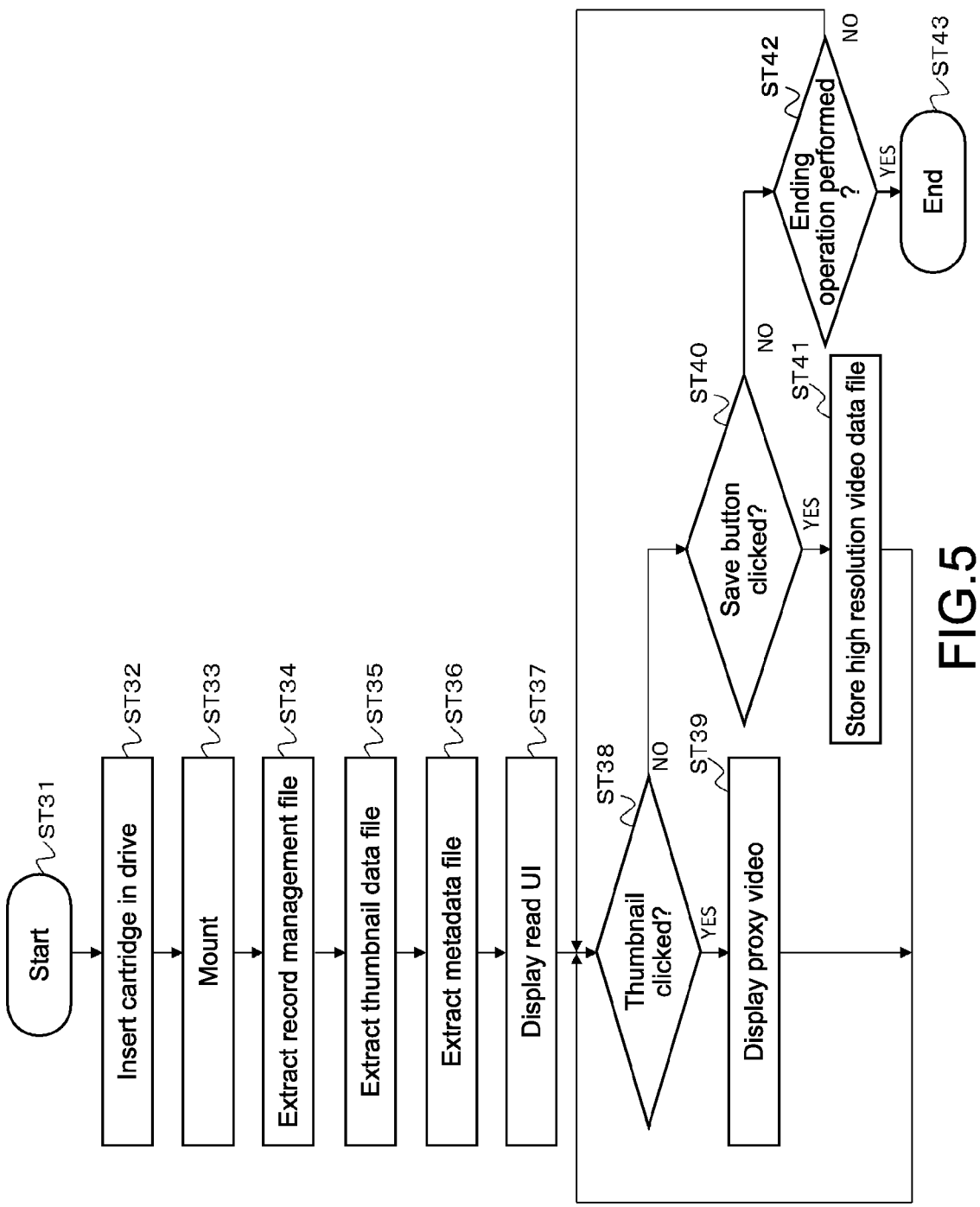
FIG. 5 is a flowchart showing an example of a processing procedure at the time of data reproducing.

A flowchart in FIG. 5 shows an example of a processing procedure at the time of data reproducing. In step ST31, the CPU 101 starts the processing. Subsequently, in step ST32, the cartridge 310 is inserted in the changer drive 200. Next, in step ST33, the file system driver is automatically mounted as the file system. It should be noted that this mount may be performed by making a request from the CPU 101 to the file system driver.

Next, in step ST34, the CPU 101 loads the second optical disc 310a of the cartridge 310 on the optical disc drive 201 and controls the changer drive 200 so as to read the record management file. The CPU 101 receives the record management file read by the changer drive 200 and retains it on the main memory 103.

The CPU 101 can grasp the correspondence relationship between the high resolution video data file recorded in the first optical disc 310a of the cartridge 310 and the corresponding low resolution video data file, metadata file, and thumbnail data file recorded in the second optical disc 310a of the cartridge 310 based on the record management file.

Next, in step ST35, the CPU 101 controls the changer drive 200 so as to read the thumbnail data file from the second optical disc 310a of the cartridge 310 loaded on the optical disc drive 201. The CPU 101 receives the thumbnail data file read by the changer drive 200 and retains it on the main memory 103.

Next, in step ST36, the CPU 101 controls the changer drive 200 so as to read the metadata file from the second optical disc 310a of the cartridge 310 loaded on the optical disc drive 201. The CPU 101 receives the metadata file read by the changer drive 200 and retains it on the main memory 103.

Figure 6:
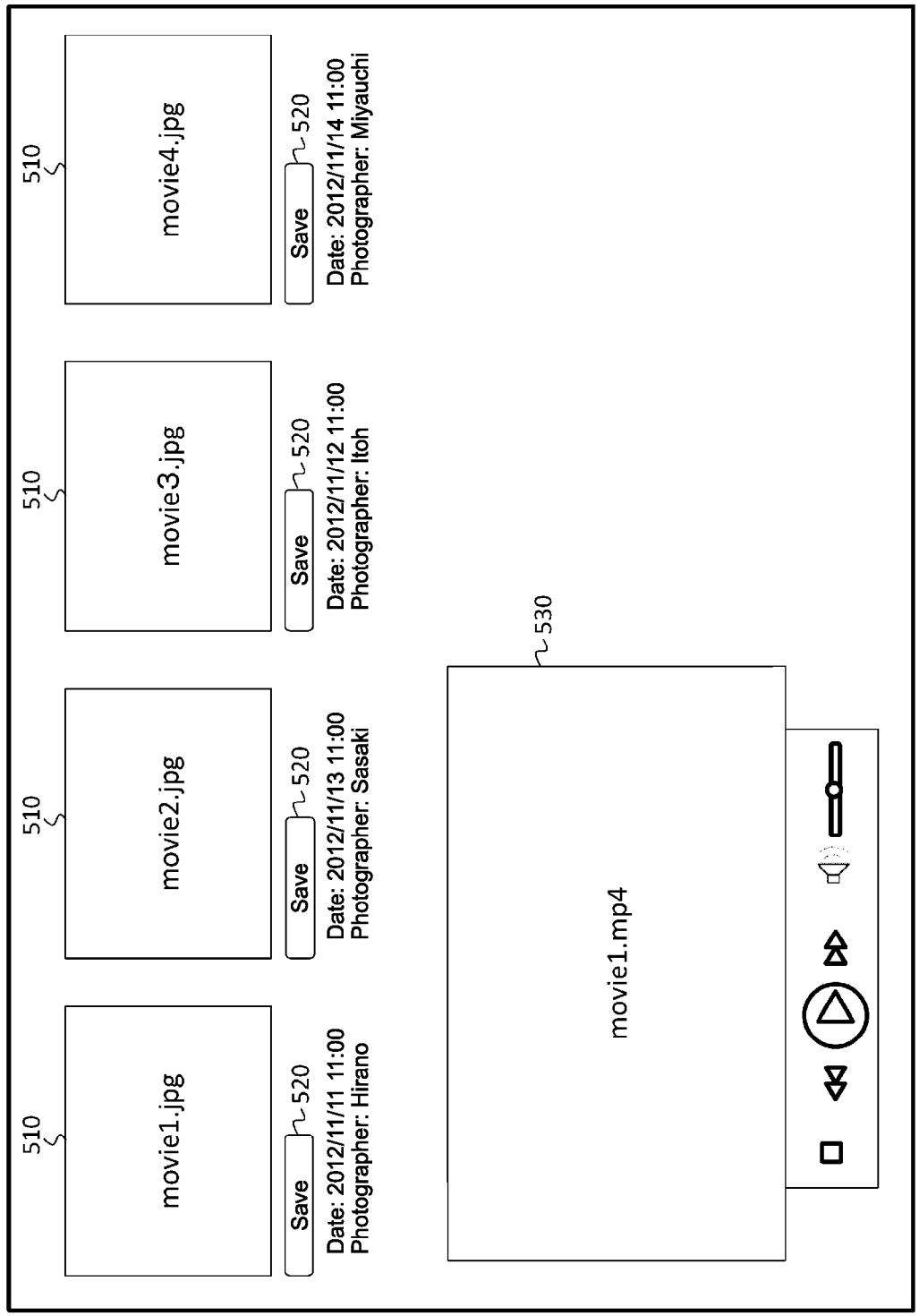
FIG. 6 is a diagram showing an example of a read UI.

Next, in step ST37, the CPU 101 displays a read user interface (UI) on the monitor 110. FIG. 6 shows an example of the read UI. Thumbnail display units 510 corresponding to the number of the thumbnails are provided on the read UI. Then, based on the thumbnail data file obtained in the above mentioned step ST35, a thumbnail image corresponding to each of the high resolution video data files recorded in the cartridge 310 is displayed on each of the thumbnail display units 510.

Moreover, in the read UI, information of each of the high resolution video data files recorded in the cartridge 310 (for example, the photographed date, the photographer, and the like) is displayed below each of the thumbnail display units 510 based on the metadata file obtained in the above mentioned step 56.

Moreover, in the read UI, a save button 520 is displayed below each of the thumbnail display units 510. This save button 520 is a button operated by the user to capture the high resolution video data file as described later. Moreover, a moving image display unit 530 is provided on the read UI. The moving image display unit 530 is a viewer for displaying a reproduction image according to the low resolution video data file (proxy video data file) as described later.

Next, in step ST38, the CPU 101 determines whether or not any thumbnail image is clicked. When the CPU 101 determines that the thumbnail image is clicked, the CPU 101 controls the changer drive 200 so as to read the low resolution video data file (proxy video data file) corresponding to the thumbnail image clicked from the second optical disc 310a of the cartridge 310 in step ST39.

The CPU 101 receives the low resolution video data file read by the changer drive 200, retains it on the main memory 103 temporarily, and displays the reproduction image (proxy video) on the moving image display unit 530 of the read UI. The user can know contents of the corresponding high resolution video data file in detail by the display of the reproduction image. After step ST39, the CPU 101 returns to step ST38.

Accordingly, when other thumbnail image is clicked, the CPU 101 controls the changer drive 200 so as to read the low resolution video data file corresponding to the clicked thumbnail image from the second optical disc 310a of the cartridge 310 and displays the reproduction image (proxy video) according to the received low resolution video data file on the moving image display unit 530 of the read UI.

When the CPU 101 determines that the thumbnail image is not clicked in step ST38, the CPU 101 determines whether or not the save button 520 is clicked in step ST40. When the CPU 101 determines that the save button 520 is clicked, the CPU 101 controls the changer drive 200 so as to read the high resolution video data file corresponding to the save button 520 clicked from the first optical disc 310a of the cartridge 310 in step ST41.

The CPU 101 receives the high resolution video data file read by the changer drive 200 and saves it in a predetermined recording medium, for example, the local HDD 104. After step S41, the CPU 101 returns to step ST38.

When the CPU 101 determines that the save button 520 is not clicked in step ST40, the CPU 101 determines whether or not an ending operation is given by the user in step ST42. The CPU 101 returns to step ST38 when the CPU 101 determines that the ending operation is not given, while the CPU 101 completes the processing in step ST43 when the CPU 101 determines that the ending operation is given.

As mentioned above, in the recording and reproducing apparatus 10 shown in FIG. 1, the low resolution video data file (proxy video data file) corresponding to the high resolution video data file recorded in the first optical disc 310a of the cartridge 310 is recorded in the second optical disc 310a of the cartridge 310, for example, one optical disc 310a.

Accordingly, the proxy video data files corresponding to all of the high resolution video data files in the cartridge 310 can be obtained without accessing all of the optical discs 310a of the cartridge 310. Therefore, the proxy video data files can be effectively obtained.

Moreover, in the recording and reproducing apparatus 10 shown in FIG. 1, the record management file for associating the high resolution video data file recorded in the first optical disc 310a of the cartridge 310 with the low resolution video data file (proxy video data file) recorded in the second optical disc 310a of the cartridge 310 is recorded in the second optical disc 310a of the cartridge 310.

Accordingly, it is possible to easily grasp the correspondence relationship between the high resolution video data file recorded in the first optical disc 310a and the proxy video data file recorded in the second optical disc 310a based on the record management file. Therefore, for example, it is possible to easily reproduce, from the first optical disc 310a, the high resolution video data file corresponding to a predetermined proxy video data file selected by the user.

Moreover, in the recording and reproducing apparatus 10 shown in FIG. 1, the thumbnail data file corresponding to the high resolution video data file recorded in the first optical disc 310a of the cartridge 310 is recorded in the second optical disc 310a of the cartridge 310. Accordingly, the thumbnail image corresponding to each of the high resolution video data files recorded in the cartridge 310 can be displayed by only accessing the second optical disc 310a of the cartridge 310, and the contents of each of the high resolution video data files recorded in the cartridge 310 can be checked effectively.

Moreover, in the recording and reproducing apparatus 10 shown in FIG. 1, the metadata file corresponding to the high resolution video data file recorded in the first optical disc 310a of the cartridge 310 is recorded in the second optical disc 310a of the cartridge 310. Accordingly, information corresponding to each of the high resolution video data files recorded in the cartridge 310 can be displayed by only accessing the second optical disc 310a of the cartridge 310, and the contents of each of the high resolution video data files recorded in the cartridge 310 can be checked effectively.

Moreover, in the recording and reproducing apparatus 10 shown in FIG. 1, the read UI (see FIG. 6) is displayed on the monitor 110 at the time of reproducing. This read UI includes the thumbnail display units 510 for displaying the thumbnail image according to the thumbnail data file recorded in the second optical disc 310a of the cartridge 310. Accordingly, the user can easily check the contents of each of the high resolution video data files recorded in the cartridge 310 based on the displayed thumbnail image.

Moreover, in the recording and reproducing apparatus 10 shown in FIG. 1, the read UI (see FIG. 6) is displayed on the monitor 110 at the time of reproducing. This read UI includes the thumbnail display units 510 for displaying the thumbnail image according to the thumbnail data file recorded in the second optical disc 310a of the cartridge 310, and the save button 520 corresponding to each of the thumbnail display units 510. Accordingly, the user can easily reproduce a desired high resolution video data from the cartridge 310 and saves it by clicking the save button 520.

2. Modified Example

It should be noted that the above mentioned embodiment describes the recording and reproducing apparatus 10 in which the PC 100 and the changer drive 200 are configured to be connected through the USB cable. Alternatively, the changer drive 200 can be integrally disposed in the PC 100.

Moreover, in the above mentioned embodiment, the changer drive 200 uses the cartridge 310 which stores the disc-shaped recording medium (optical disc 310a) as a removable recording medium. However, it should be appreciated that the present disclosure can be applied even when the changer drive 200 handles the cartridge which stores a tape-shaped recording medium.

Moreover, when a plurality of cartridges are shelf-managed, it is necessary to retrieve contents of the plurality of cartridges for each cartridge to retrieve a desired video data file. Switching the cartridge to be retrieved is extremely time-consuming and inefficient. Accordingly, the proxy video data files corresponding to the high resolution video data files included in all of the cartridges placed on a shelf can be saved in one cartridge. In this case, the contents of the high resolution video data files recorded in the plurality of cartridges are effectively viewable only by reading the one cartridge.

Moreover, the present disclosure may have configurations described below.

(1) A recording apparatus, including
a data recording unit configured to record data in a cartridge which is mounted on a cartridge mounting unit and stores a plurality of recording media, the data recording unit being configured to record a first resolution video data file having a first resolution in a first recording medium of the cartridge and record, in a second recording medium of the cartridge, a second resolution video data file having another resolution lower than the first resolution corresponding to the first resolution video data file recorded in the first recording medium.

(2) The recording apparatus according to Item (1), further including
a file system driver having a function of representing the plurality of recording media as one volume.

(3) The recording apparatus according to Item (2), in which
the data recording unit is configured to record a predetermined number of the first resolution video data files in the first recording medium constituting the one volume and then record the predetermined number of the second resolution video data files in the second recording medium constituting the one volume.

(4) The recording apparatus according to Item (1), further including
a file system driver having a function of representing the first recording medium as a first volume and the second recording medium as a second volume.

(5) The recording apparatus according to Item (4), in which
the data recording unit is configured to record one second resolution video data file in the second volume every time one first resolution video data file is recorded in the first volume.

(6) The recording apparatus according to any one of Items (1) to (5), in which
the data recording unit is configured to record, in the second recording medium, a record management file for associating the first resolution video data file recorded in the first recording medium with the second resolution video data file recorded in the second recording medium.

(7) The recording apparatus according to Item (6), in which
the record management file is created in a comma separated value format.

(8) The recording apparatus according to Item (6), in which
the record management file is created in an extensible markup language format.

(9) The recording apparatus according to any one of Items (1) to (8), in which
the data recording unit is configured to record, in the second recording medium, a thumbnail data file corresponding to the first resolution video data file recorded in the first recording medium.

(10) The recording apparatus according to any one of Items (1) to (9), in which
the data recording unit is configured to record, in the second recording medium, a metadata file corresponding to the first resolution video data file recorded in the first recording medium.

(11) A recording method, including:
firstly recording a first resolution video data file having a first resolution in a first recording medium of a cartridge which is mounted on a cartridge mounting unit and stores a plurality of recording media; and
secondly recording, in a second recording medium of the cartridge, a second resolution video data file having another resolution lower than the first resolution corresponding to the first resolution video data file recorded in the first recording medium.

(12) A reproducing apparatus, including
a data reproducing unit configured to reproduce data from a cartridge which is mounted on a cartridge mounting unit and stores a plurality of recording media, the cartridge including a first recording medium and a second recording medium, the first recording medium recording a first resolution video data file having a first resolution, the second recording medium recording a second resolution video data file having another resolution lower than the first resolution corresponding to the first resolution video data file recorded in the first recording medium and a record management file for associating the first resolution video data file recorded in the first recording medium with the second resolution video data file recorded in the second recording medium,
the data reproducing unit being configured to extract the record management file from the second recording medium and recognize a correspondence between the first resolution video data file recorded in the first recording medium and the second resolution video data file recorded in the second recording medium.

(13) The reproducing apparatus according to Item (12), in which the second recording medium of the cartridge further stores a thumbnail data file corresponding to the first resolution video data file recorded in the first recording medium, the reproducing apparatus further including a reproduction controller configured to execute control to display a thumbnail image according to the thumbnail data file reproduced by the data reproducing unit, and reproduce the second resolution video data file by the data reproducing unit based on an operation input corresponding to the thumbnail image and display a low resolution image according to the reproduced second resolution video data file.

(14) The reproducing apparatus according to Item (12) or (13), in which the second recording medium of the cartridge further stores a thumbnail data file corresponding to the first resolution video data file recorded in the first recording medium, the reproducing apparatus further including a reproduction controller configured to execute control to display a thumbnail image according to the thumbnail data file reproduced by the data reproducing unit, and display a save button adjacent to the thumbnail image, reproduce the first resolution video data file by the data reproducing unit based on an operation input corresponding to the save button, and save the reproduced first resolution video data file.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus, comprising:
a data recording unit configured to record data in a cartridge which is mounted on a cartridge mounting unit, wherein the cartridge stores a plurality of recording media, and
wherein the data recording unit is configured to record first resolution video data files having a first resolution in a first recording medium of the cartridge and record, in a second recording medium of the cartridge, second resolution video data files having another resolution lower than the first resolution and corresponding to the first resolution video data file recorded in the first recording medium; and
a file system driver that represents the plurality of recording media as one volume, wherein the data recording unit is configured to record a predetermined number of the first resolution video data files in the first recording medium constituting the one volume and then record a predetermined number of the second resolution video data files in the second recording medium constituting the one volume.

2. The recording apparatus according to claim 1, wherein the data recording unit is configured to record one second resolution video data file every time one first resolution video data file is recorded.

3. The recording apparatus according to claim 1, wherein the data recording unit is configured to record, in the second recording medium, a record management file for associating at least one of the first resolution video data files recorded in the first recording medium with a corresponding at least one of the second resolution video data files recorded in the second recording medium.

4. The recording apparatus according to claim 3, wherein the record management file is created in a comma separated value format.

5. The recording apparatus according to claim 3, wherein the record management file is created in an extensible markup language format.

6. The recording apparatus according to claim 1, wherein the data recording unit is configured to record, in the second recording medium, a thumbnail data file corresponding to the first resolution video data files recorded in the first recording medium.

7. The recording apparatus according to claim 1, wherein the data recording unit is configured to record, in the second recording medium, a metadata file corresponding to the first resolution video data files recorded in the first recording medium.

8. A reproducing apparatus, comprising:
a data reproducing unit configured to reproduce data from a cartridge that is mounted on a cartridge mounting unit, wherein the cartridge stores a plurality of recording media, the cartridge including a first recording medium and a second recording medium, the first recording medium recording a first resolution video data file having a first resolution, the second recording medium recording a second resolution video data file having another resolution lower than the first resolution corresponding to the first resolution video data file recorded in the first recording medium and a record management file for associating the first resolution video data file recorded in the first recording medium with the second resolution video data file recorded in the second recording medium, the data reproducing unit being configured to extract the record management file from the second recording medium and recognize a correspondence between the first resolution video data file recorded in the first recording medium and the second resolution video data file recorded in the second recording medium, wherein
the second recording medium of the cartridge further stores a thumbnail data file corresponding to the first resolution video data file recorded in the first recording medium; and
a reproduction controller configured to execute control to display a thumbnail image according to the thumbnail data file reproduced by the data reproducing unit, and reproduce the second resolution video data file by the data reproducing unit based on an operation input corresponding to the thumbnail image and display a low resolution image according to the reproduced second resolution video data file.

9. A reproducing apparatus, comprising:
a data reproducing unit configured to reproduce data from a cartridge that is mounted on a cartridge mounting unit wherein the cartridge stores a plurality of recording media, the cartridge including a first recording medium and a second recording medium, the first recording medium recording a first resolution video data file having a first resolution, the second recording medium recording a second resolution video data file having another resolution lower than the first resolution corresponding to the first resolution video data file recorded in the first recording medium and a record management file for associating the first resolution video data file recorded in the first recording medium with the second resolution video data file recorded in the second recording medium, the data reproducing unit being configured to extract the record management file from the second recording medium and recognize a correspondence between the first resolution video data file recorded in the first recording medium and the second resolution video data file recorded in the second recording medium, wherein the second recording medium of the cartridge further stores a thumbnail data file corresponding to the first resolution video data file recorded in the first recording medium; and a reproduction controller configured to execute control to display a thumbnail image according to the thumbnail data file reproduced by the data reproducing unit, and display a save button adjacent to the thumbnail image, reproduce the first resolution video data file by the data reproducing unit based on an operation input corresponding to the save button, and save the reproduced first resolution video data file.

* * * * *